(12) United States Patent
Sabounjian

(10) Patent No.: US 8,887,932 B2
(45) Date of Patent: Nov. 18, 2014

(54) SHELVING UNIT AND METHOD FOR ASSEMBLING THE SHELVING

(71) Applicant: Pro-Mart Industries, Inc., Irvine, CA (US)

(72) Inventor: Azad Sabounjian, Irvine, CA (US)

(73) Assignee: Pro-Mart Industries, Inc., Irvine, CA (US)

( * ) Notice: Subject to any disclaimer, the term of this patent is extended or adjusted under 35 U.S.C. 154(b) by 0 days.

(21) Appl. No.: 13/837,002

(22) Filed: Mar. 15, 2013

(65) Prior Publication Data

US 2014/0263135 A1   Sep. 18, 2014

(51) Int. Cl.
*A47B 47/00* (2006.01)
*A47B 55/00* (2006.01)

(52) U.S. Cl.
CPC ..................... *A47B 47/00* (2013.01)
USPC .......................... 211/186; 108/181

(58) Field of Classification Search
CPC .............. A47B 3/00; A47B 4/04; A47B 4/05; A47B 4/028; A47B 57/32; A47B 57/34; A47B 2220/0055; A47F 5/01; A47F 5/0081
USPC ......... 211/186, 187, 188, 189, 190, 191, 192, 211/194, 204, 206; 108/180, 181, 186, 187; 248/235, 250, 295.11
See application file for complete search history.

(56) References Cited

U.S. PATENT DOCUMENTS

| | | | | |
|---|---|---|---|---|
| 862,128 | A | * | 8/1907 | Belcher ......................... 108/96 |
| 1,687,671 | A | * | 10/1928 | June .............................. 108/186 |
| 2,919,817 | A | * | 1/1960 | Maslow ........................ 108/181 |
| 3,146,734 | A | * | 9/1964 | Kesilman et al. ............. 108/181 |
| 3,208,408 | A | * | 9/1965 | Maslow ........................ 108/148 |
| 3,722,431 | A | * | 3/1973 | Howard ................... 108/157.13 |
| 4,231,301 | A | * | 11/1980 | Barrineau, III ............... 108/146 |
| 4,292,902 | A | * | 10/1981 | Barrineau ..................... 108/146 |

* cited by examiner

*Primary Examiner* — Joshua Rodden
(74) *Attorney, Agent, or Firm* — Stetina Brunda Garred & Brucker; Lowell Anderson

(57) ABSTRACT

A method of assembling a shelving unit uses corner posts each having opposing inner and outer surfaces having mating slots therein at shelf engaging locations. Shelves have parallel slats spaced apart along the length of a front and rear connecting rod adjacent opposing ends of each shelf. The outer two slats on each opposing side of each shelf are squeezed inward of one of the connecting rods to spread distal ends of those slats in order to insert those distal ends into the mating slots in the opposing sides of the corner posts.

11 Claims, 3 Drawing Sheets

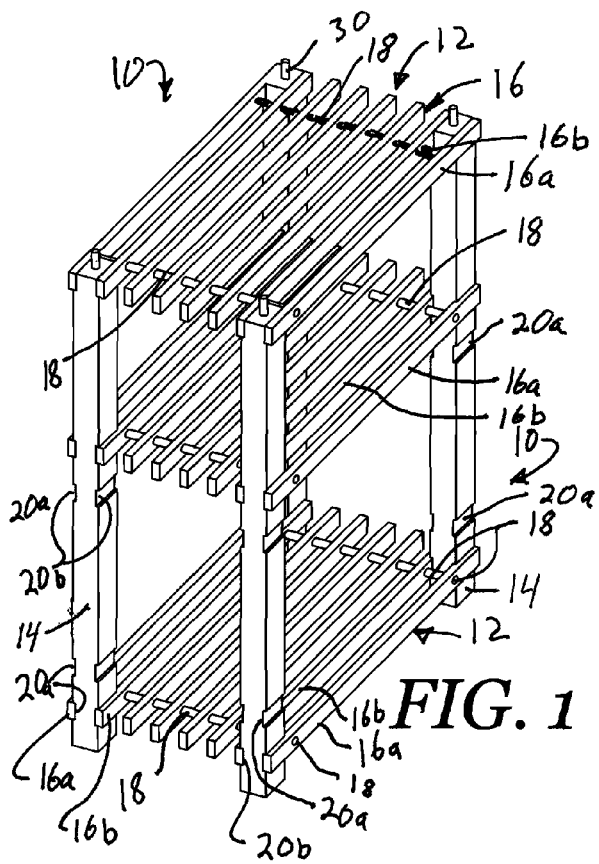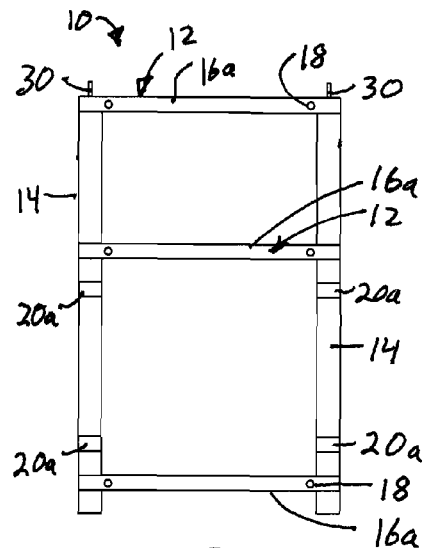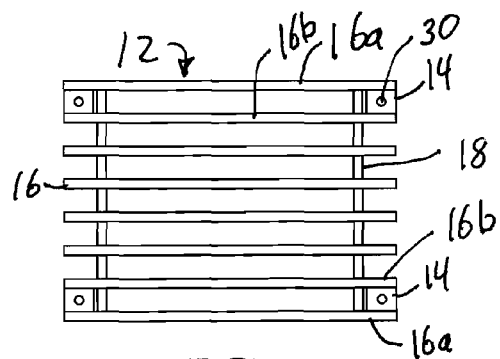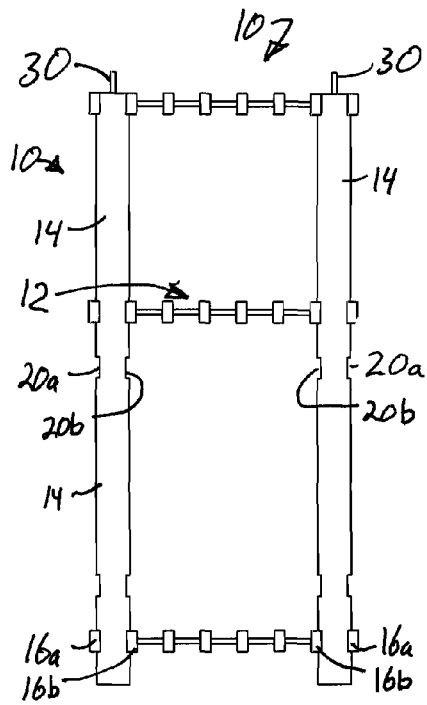
FIG. 1
FIG. 2
FIG. 4
FIG. 3

SHELVING UNIT AND METHOD FOR ASSEMBLING THE SHELVING

CROSS-REFERENCE TO RELATED APPLICATIONS

Not applicable

STATEMENT RE: FEDERALLY SPONSORED RESEARCH/DEVELOPMENT

Not Applicable

BACKGROUND

Existing rack and shelving units use corner posts to support longitudinal supports across which horizontal or slightly inclined shelves are placed. The longitudinal supports have metal end fittings with numerous prongs extending therefrom or perpendicular thereto and shaped to fit into numerous shaped openings in the corner posts. The fabrication of these connectors is complex and costly. It also takes time to fit the shaped protrusions into the shaped recesses and even more time to undo such connections if the shelving is to be removed or repositioned. There is thus a need for a simpler way to connect shelves to vertical supports such as corner posts.

BRIEF SUMMARY

A method of assembling a shelving unit uses corner posts each having opposing inner and outer surfaces having slots therein at shelf engaging locations. The shelves have parallel slats spaced apart along the length of a front and rear connecting rod adjacent opposing ends of the shelf. The outer two slats on each opposing side of the shelf are squeezed inward of one of the connecting rods to spread the distal ends of those slats in order to insert those distal ends into mating slots in the opposing sides of the corner posts.

There is also provided a shelving unit is provided with a plurality of shelves formed of a plurality of elongated support members arranged parallel to each other and joined by transverse connecting rods to form a shelf having four corners. The elongated support members are referred to herein as rails. The rails have opposing ends and one transverse connecting rod is located inward of each end at a predetermined distance. The connecting rods are perpendicular to the rails and restrain movement of the rails toward one another along the length of the rod. A pair of members extending along each at opposing side of the shelves is arranged so that each rail in a pair of rails fit into a mating recess on an opposing side of a corner post so the bottom of the recess supports the rail and prevents it from moving downward. The pair of rails are spaced apart a distance about the same as or slightly smaller than the lateral distance between the notches on the corner post so the rails do not slide downward out of the notches. This connection is repeated at each of the four corners of the shelf. To make it easier to fit the ends of a pair of rods into the two corresponding notches the two rods are squeezed inward of the connecting rod, causing the distal ends of the rods to spread apart on the other side of the connecting rod a distance sufficient to allow the spread ends to be fit into the two notches on opposing sides of the corner post. When the squeezing is released the distal ends resume their parallel orientation and clamp the corner post in the notches. A user can grab opposing pairs of rods on opposing sides of a shelf and insert two rods on each corner into their respective notches thus quickly and easily connecting one end of a shelf to the corner posts.

There is thus advantageously provided a shelving assembly having a plurality of rectangular shelves. The shelves have opposing ends and sides with each shelf having an inner and outer slat both of which extend along a different one of the opposing sides of the shelf. The adjacent inner and outer slats have opposing distal ends each joined by a different connecting rod to limit movement of the adjacent inner and outer slats toward each other at the connecting rod. The distal ends have a rectangular cross section having a width and height. The assembly also includes a plurality of corner posts having opposing inner and outer sides with aligned inner and outer recesses on those inner and outer sides of the corner post, respectively. The recesses are located at predetermined distances from a bottom of the corner posts where the shelves are to engage the corner posts. Each recess is sized and shaped to correspond to the distal end of one of the inner and outer slats and to snuggly receive that distal end during use. The slats are sufficiently flexible and close enough together that a user can grab adjacent inner and outer slats at a location inward of the connecting rod and squeeze them toward each other enough to spread the distal ends of the squeezed slats apart an amount that is sufficient to fit those distal ends into ends of the aligned and corresponding recesses in the corner posts.

In further variations, the recesses take the form of open ended slots extending across the entire width of each corner post. The slots have a depth less than the width of the distal end of the slat that fits into the slot during use. The inner and outer slats preferably have the same rectangular cross-section and the corner posts preferably also have a rectangular cross-section, with the aligned slots having a rectangular cross-section corresponding to that of the slats but with a slot depth less than the width of the slats.

There is also provided a shelving kit that includes a plurality of rectangular shelves having opposing ends and sides. Each shelf has an inner and outer slat both of which extend along a different one of the opposing sides of the shelf. The adjacent inner and outer slats have opposing distal ends each joined by a different connecting rod limiting movement of the adjacent inner and outer slats toward each other at the connecting rod. The distal ends may have a rectangular cross section having a width and height. The kit also includes at least first, second, third and fourth corner posts each having opposing inner and outer sides with aligned inner and outer recesses on those inner and outer sides of the corner post, respectively. The recesses are located at predetermined distances from a bottom of each corner post where the shelves are to engage the corner posts. Each recess is sized and shaped to correspond to the distal end of one of the inner and outer slats and to snuggly receive that distal end during use. The slats are sufficiently flexible and close enough together that a user can grab adjacent inner and outer slats at a location inward of the connecting rod and squeeze them toward each other enough to spread the distal ends of the squeezed slats apart an amount sufficient to fit those distal ends into ends of the aligned and corresponding recesses in the corner posts.

In further variations, the recesses comprise open ended slots extending across an entire width of each corner post, where the slots have a depth less than the width of the distal end of the slat that fits into the slot during use. Further, each pair of outer and inner slats may have the slats spaced apart a distance d and wherein the distal ends of those slats have a height H and wherein the recesses have a height H and extend generally horizontally across the inner side and the outer side at horizontally aligned inner and outer locations where shelves are to attach to the corner posts. Further, the distance between an inner surface of an aligned inner and outer recess is distance d which corresponds to the distance between the adjacent inner and outer slats. Further, the inner and outer slats preferably have the same rectangular cross-section and the corner posts have a rectangular cross-section, with the aligned recesses having a rectangular cross-section corresponding to that of the slats but with a recess depth less than a width of the slats.

There is also provided a method of fastening horizontal shelves to a plurality of vertical corner posts. The method includes providing at least one of the shelves with a pair of adjacent outer and inner slats extending along each opposing side of the at least one shelf. Each pair of outer and inner slats is spaced apart a distance d and has a height H. Each pair of slats has opposing first and second distal ends with the first distal ends being connected adjacent the first distal ends by a first connecting rod that is perpendicular to the slats. The second distal ends are connected by a second connecting rod that is perpendicular to the slats and parallel to the first connecting rod. The method also includes providing first, second third and fourth corner posts where each corner post has an inner side and an opposing outer side with a plurality of slots in those sides. The slots have a height H extending generally horizontally across the inner side and the outer side at horizontally aligned inner and outer locations where shelves are to attach to the corner posts. The distance between an inner surface of an aligned inner and outer slot is the distance d. The method also includes placing a first pair of distal ends adjacent two aligned slots on the first corner post and then squeezing the slats associated with that first pair of distal ends at a location inward of the connecting rod to spread the distal ends of that first pair of slats apart. The method then includes placing each of the distal ends of that first pair of slats into a different one of the aligned slots on the first of the corner posts.

In further variations, the method further includes placing a second pair of distal ends adjacent two aligned slots on the second corner posts and then squeezing the slats associated with that second pair of distal ends at a location inward of the connecting rod to spread the distal ends of that second pair of slats apart, and then placing each of the distal ends of that second pair of slats into a different one of the aligned slots on the second of the corner posts. The steps may be repeated for the third and fourth corner posts to connect them to the respective distal ends of the slats associated with the slots on those corner posts. The method may also include squeezing one pair of adjacent slats with a user's left hand while squeezing a second set of adjacent slats with the user's right hand. The shelves used preferably have a plurality of equally spaced slats and the slats are spaced a distance apart sufficient for a person to insert fingers between the slats to squeeze them toward each other.

BRIEF DESCRIPTION OF THE DRAWINGS

These and other features and advantages of the invention will become more apparent in light of the following discussion and drawings, in which like numbers refer to like parts throughout, and in which:

FIG. 1 is a perspective view of a three-tier shelving unit of this invention;

FIG. 2 is an end view of a shorter shelving unit shown in FIG. 4, with the opposing side being a minor image thereof;

FIG. 3 is a plan view of an end of the shelving unit of FIG. 1, with the opposing end being the mirror image thereof;

FIG. 4 is a top plan view of the shelving unit of FIG. 1, with the opposing side being a minor image thereof;

DETAILED DESCRIPTION

Figure 5:
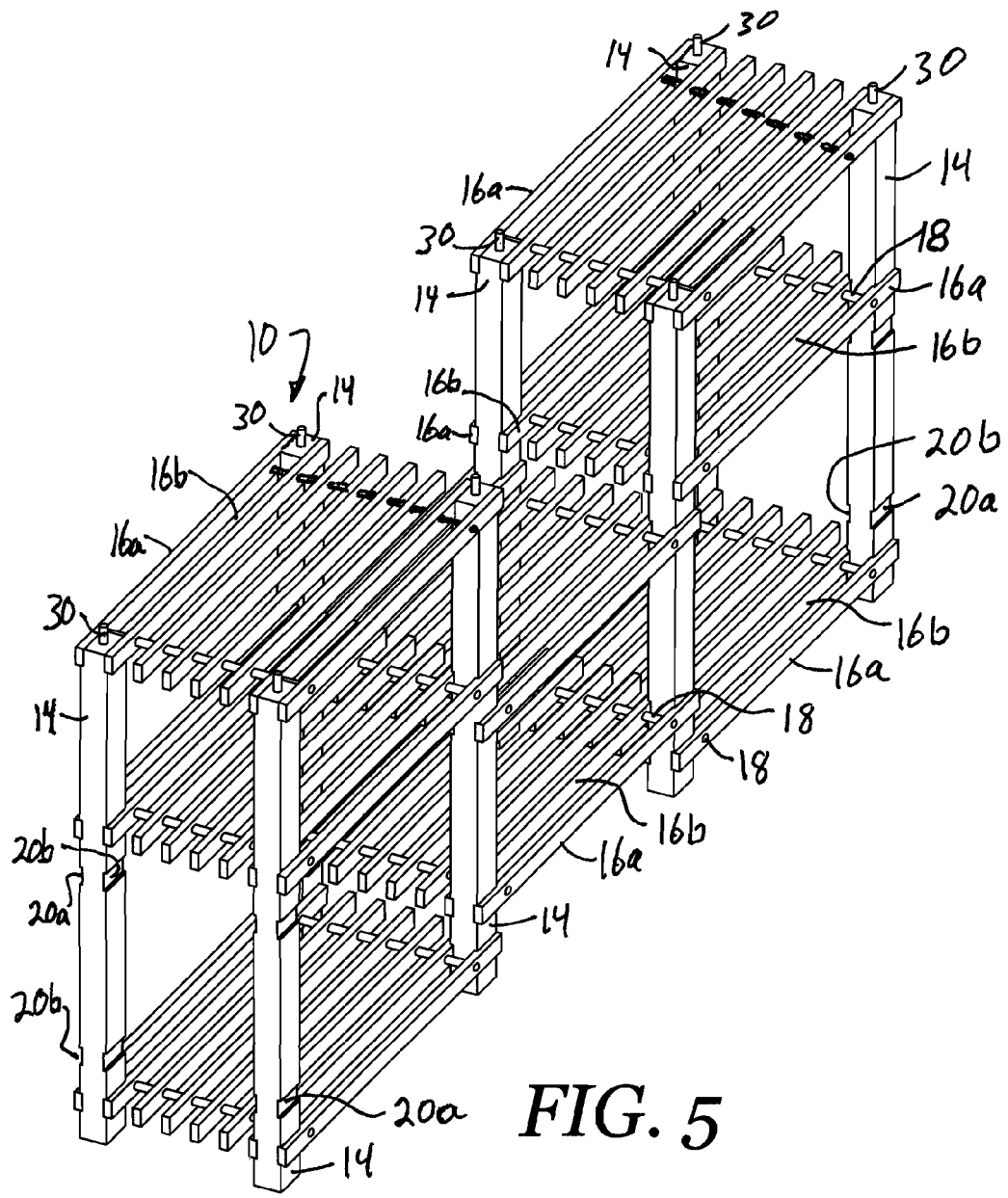
FIG. 5 is a perspective view of a shelving assembly using the shelving units of FIGS. 1 and 3.
Figure 6:
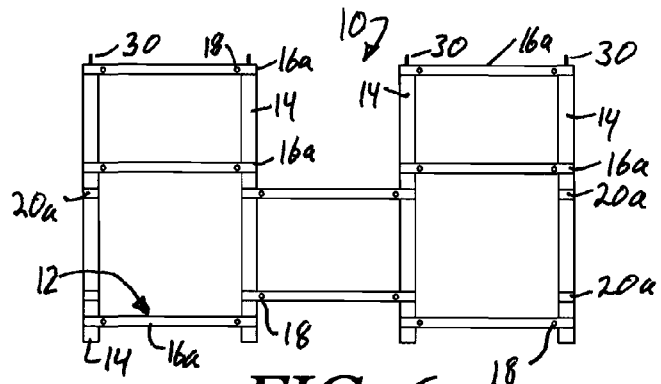
FIG. 6 is a front plan view of the shelving assembly of FIG. 5.
Figure 7:
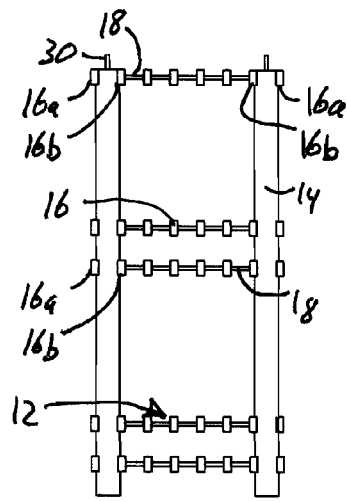
FIG. 7 is a right side plan view of the shelving assembly of FIG. 5 with the opposing side being a minor image thereof.
Figure 8:
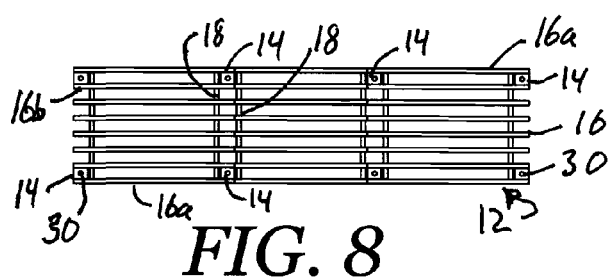
FIG. 8 as a top plan view of the shelving assembly of FIG. 5.

Referring to FIGS. 1-4 a shelving unit 10 is provided having a shelf 12 with four corners each of which engages a corner post 14. The shelves 12 are generally planar with a plurality of uniform length, elongated slats 16 arranged parallel to each other but spaced apart, and connected by two transverse connecting rods 18 each adjacent each opposing end of the shelf. The slats 16 are generally rectangular in cross-section and are preferably of metal, wood or plastic, and preferably wooden slats or other wooden members with rectangular cross sectional shapes—although other cross-sectional shapes can be used. The connecting rods 18 are preferably cylindrical rods of metal, wood or plastic, preferably wooden dowels. The connecting rods 18 are permanently joined to the slats 18, preferably by adhesives or fasteners or an interference fit. The connecting rods 18 preferably pass through the centerline of the slats 16 inward from the distal ends of the slats 16.

Along each opposing side of the shelf 12 are exterior slat 16a and the first interior slat 16b. The slats 16a, 16b are flexible enough and spaced close enough together that a user can manually squeeze the slats 16a, 16b toward each other at a location inward of but adjacent to the connecting rod 18 and by doing so the distal ends of the slats 16a, 16b spread apart or splay. Because the slats 16a, 16b are held in spaced relationship relative to each other at the connecting rod 18, the slats bend at the location of the connecting rod rather than slide toward each other. Thus, moving the slats 16a, 16b closer together on one side of the connecting rod 18 spreads those slats apart on the other side of the connecting rod.

Slats 16a, 16b spaced from 2-6 inches apart are believed suitable, with spacing of about 1-3 inches between adjacent sides of the slats being preferred. The spacing between slats 16 is preferably large enough to insert a person's thumb or fingers in order to squeeze the slats 16 together, but not so far apart that a person cannot grab opposing sides of adjacent side slats 16a, 16b in one hand. Likewise, while the slats must be strong enough to support the shelf 12 and items on the shelf, the slats 16a, 16b are thin enough to be manually deformed toward one another when a user squeezes them together so as to spread the distal ends apart. Not much motion of the slat ends may be needed so the slats may be fairly stiff. The connecting rod 18 may thus be adjacent the corner post 14, advantageously within a few inches along the length of the slats 16a, 16b.

The distal ends of the slats 16a, 16b fit into corresponding recesses 20a, and 20b formed in the outer surface of corner posts 14. A corner post 14 is located at each corner of the shelf 12. Recess 20a is on an opposing side of the corner post 14 as the recess 20b, with the recesses 20 being aligned so that a bottom of the recess is horizontal or slightly inclined downward and a top of the recess is also horizontal or slightly inclined upward. As used herein, the relative terms upward and downward are with respect to the orientations of the parts shown in FIG. 1, with the direction of gravity being downward and upwards being the opposite direction.

The recesses 20 are have a width or depth into the corner post 14 that is preferably from about ¼ the thickness of the slat 16 to about the full thickness of the slat, with a depth of about 40-50% the slat width being preferred. The depth of the recess 20 is enough so the slat 16 does not slide out of the recess during normal use. The recesses 20 have a height that corresponds to the height of the end of the slat 16 that fits into the recess. The spacing between the inner surfaces of two opposing recesses 20a, 20b in the same corner post is about the same as or slightly smaller than the spacing between the facing sides of slats 16a, 16b. Squeezing the slats 16a, 16b together to spread the distal ends of those slats facilitates inserting the ends of the slats into the corresponding recesses 20a, 20b, with the recesses sized to snugly receive the corresponding ends of the slats.

As seen in FIGS. 1-3, the recesses 20 are rectangular in shape and present rectangular notches or recesses on opposing sides of each corner post 14 at the desired location of shelves 20 when viewed along a length of the slats 16 (FIG. 3). The recesses 20 are seen as horizontal strips when viewed along a lateral axis parallel to the axis of connecting rod 18 (FIG. 2). The depicted corner posts 14 have three sets of recesses 20a formed in one side and three corresponding sets of recesses 20b in the opposing side of the corner post. The recesses may be alternatively described as open ended slots in the exterior surface or outer surface or the side of the corner post and extending perpendicular to the longitudinal axis of the corner post. The height of the recess slot 20a, 20b is the same as the height of the slat 16a, 16b that mates with the slot width of the slot and preferably slightly larger to make it easier to fit the parts together. But the fit is preferably a snug fit rather than an interference fit or a loose fit in which the slat 16 can slant or incline within the slot more than a few degrees.

For assembly, the user grabs opposing sides of a shelf 12 adjacent one end and inward of the connecting rod 18 so as to grab slats 16a, 16b on the right side of the shelf with the right hand, and grabs slats 16a, 16b on the left side with the left hand. The user then squeezes the slats 16a, 16b toward each other which spreads the distal ends of slats 16a, and 6b apart, whereupon the user slips the slats 16a, 16b into the corresponding recesses 20a, 20b and then releases the slats so they resiliently engage the recesses. Spreading the ends of slats 16a, 16b apart makes it much easier to fit the ends into the corresponding recesses 20a, 20b. The same process is then repeated for the other end of the shelf 12, and for other shelves 12. It is preferable to connect the bottom shelf 12 first, but need not be so. The first two corner posts 14 joined to the shelf can be leaned against a wall and the shelf 12 joined horizontally to the corner posts, or the corner posts 14 can be laid flat on a floor and the shelf 12 placed vertically to join the posts.

Referring to FIG. 1, the shelves 12 are joined with the slats 16a, 16b extending across the full width of the recess 20a, 20b the length of the recess 20 helps hold the engaged slat 20 aligned with the recess 20. The recesses 20 should be horizontal and perpendicular to the longitudinal axis of the corner post 20 in which the recesses are formed. The recesses 20 are formed with the bottom edge of the recess a predetermined distance from the bottom of the corner post, and the recesses are formed in pairs, one on each opposing side of the corner post with each recess in a pair being parallel with the other and each recess having the same shape and the same location relative to the bottom of the corner post in which the pair of recesses are formed.

Referring to FIGS. 1-3, additional pairs of recesses 20 may be formed in selected ones of the corner posts if the shelving unit 10 is going to be joined to another shelving unit 10 or other piece of furniture to form a larger assembly. Thus, between the lower and middle shelves there are additional 20 recesses that are slightly offset below the middle recesses connected to the middle shelf 12 and slightly offset above the lower recesses connected to the lower shelf 12.

Referring to FIGS. 1-8, two shelving 10 units as shown in FIG. 1 are joined by two additional shelves 12 to form a shelving assembly as more easily seen in FIG. 5. Each shelf 12 and corner post 14 is constructed as previously described, and is assembled as previously described. Those corner posts joined to more than one shelving unit have additional pairs of recesses 20 to receive the mating pairs of slats 16, where each pair contains the outer and inner slat 16a, 16b that may be spread to more easily engage the mating recesses 20a, 20b on the corner post 14 to which the shelf is joined.

As seen in FIGS. 1-8, a connector post 30 is optionally located in the top end of each corner post 14 so that another corner post can be set on top of and joined to the lower corner post 14. The bottom and top ends of each corner post 14 thus preferably, but optionally have a centrally located hole configured to receive a connector post 30. The post 30 may have various cross-sectional shapes, but a cylindrical shape is preferred. The post 30 may be of metal, plastic or wood, with a wood dowel preferred.

Figure 9:
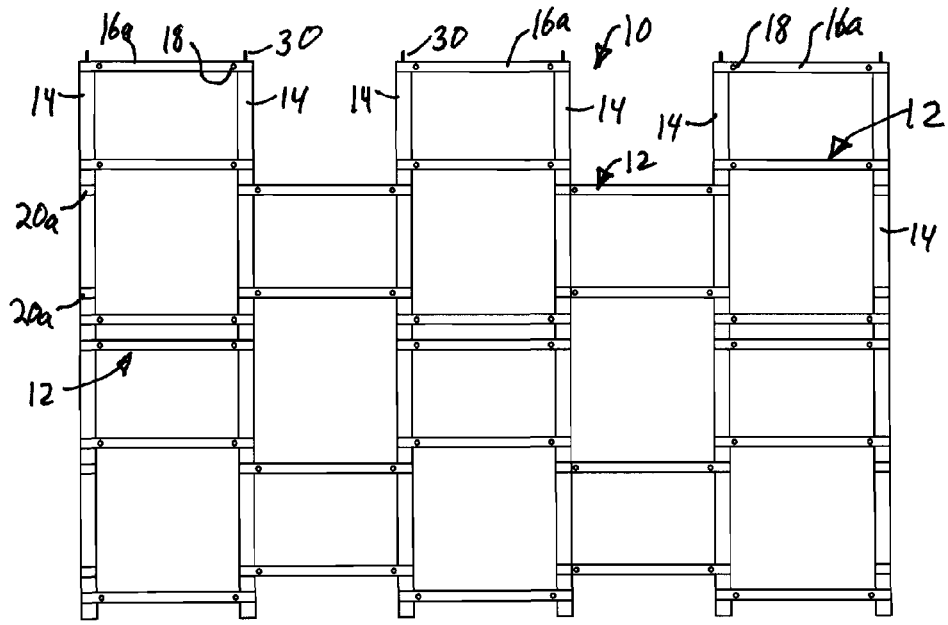
FIG. 9 is a front plan view of a further embodiment of a shelving assembly.

FIG. 9 shows two shelving assemblies as shown in FIG. 5 to be stacked on top of each other, with the post 30 in each lower corner post mating with a similarly shaped hole in the bottom of the upper corner post in order to join two vertically aligned corner posts. The posts restrain motion in the lateral plane or horizontal plane orthogonal to the longitudinal axis of the corner posts 14. Using adhesives, interference fit or laterally extending fasteners can restrain vertical motion and avoid separating the shelving units 10 and corner posts 14 as well. But usually the weight of the shelving units 10 is sufficient to maintain the shelving in its assembled configuration.

If the corner posts 14 and slats 16 are made of wood, the shelving units 12 may be made quickly and inexpensively. The parts may be stacked together for compact shipment and easily assembled by squeezing adjacent slats 16a, 16b to splay the ends of those slats and slip those ends into the mating recesses or slots 14. While the shelves 12 are shown as made entirely of spaced-apart slats 12 that need not be the case. The two pairs of slats with each pair having outer and inner slats 16a, 16b, located on opposing sides of the shelf 12, may be joined by a sheet of material or other structure to form the main body of the shelf which is connected to one or both of the pairs of slats and/or connecting rod 18.

As depicted the distal ends of the slats 16a, 16b extend the entire horizontal width of the recess or slot 14 in the corner post. This is believed most efficient. But if desired interior corner posts 14 may be made wider so that the length of the recess or slot 20 is longer, and then the distal ends of two different slats 16a, 16b may be placed in the same recess 20, with the different slats preferably abutting and exiting opposing sides of the recess 20. In the depicted embodiment the outer and inner slats 16a, 16b have the same cross-sectional dimensions, with a width W and length L in the plane of the shelf 12, and a height H measured along an axis parallel to the corner posts 14 and orthogonal to the plane of the shelf 12. The height of the slats 16 could vary, and if the distal ends of the slats 16a, 16b are not the same then the corresponding slots or recesses 20 would also vary to correspond to the mating distal end of the slat received in the slot or recess 20. Thus, for example, the distal ends of the outer slats 16a may have a height of H1 and the distal ends of inner slats 16b may have a height H2 where H1 is greater than H2. If so, then the outer recesses or slots 20a have a height of about H1 or slightly greater and the inner recesses or slots 20b have a height of about H2 or slightly greater. The corner posts preferably have a rectangular cross-section, which as used herein includes a square cross section. The shelving unit 10 may have rollers or wheels on the bottom of the corner posts to provide a movable shelving unit.

For ease of manufacturing the corner posts 14 may be laid side by side and the recesses or slots 20 cut into the sides of the posts at the same time or sequentially. The shelves 12 may be preassembled and stacked flat on top of each other. The shelves 12 and posts 14 may be packaged together or separately for ease of shipment. The connector posts 30 may be shipped separately or inserted into recesses in the ends of the corner posts before shipment. As desired, a corner cap or filial may be provided having a pleasing appearance with a bottom having a hole configured to mate with the connector post. The user then has the option of inserting connector posts 30 to stack shelving units 10 on top of one another, or the user may affix a filial to the corner post. Filials are well known, having spherical, cube, spiral or other shapes Although these inventions have been disclosed in the context of certain preferred embodiments and examples, it will be understood by those skilled in the art that the present inventions extend beyond the specifically disclosed embodiments to other alternative embodiments and/or uses of the inventions and obvious, modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A shelving assembly, comprising:
    a plurality of rectangular shelves having opposing ends and sides, each shelf having a pair of adjacent inner and outer slats both of which extend along a different one of the opposing sides of the shelf, each of the pairs of the adjacent inner and outer slats having opposing distal ends each joined by a respective connecting rod limiting movement of each of the pairs of the adjacent inner and outer slats toward each other at the respective connecting rod, the distal ends having a rectangular cross section having a width and height;
    a plurality of corner posts having opposing inner and outer sides with aligned inner and outer recesses on those inner and outer sides of the corner post, respectively, the recesses located at predetermined distances from a bottom of the corner posts where the shelves are to engage the corner posts, each recess sized and shaped to correspond to the distal end of one of the inner and outer slats and snuggly receive that distal end during use, each of the pairs of adjacent inner and outer slats being sufficiently flexible and close enough together that a user can grab each of the pairs of adjacent inner and outer slats at a location inward of the one of connecting rods and squeeze them toward each other enough to spread the distal ends of the squeezed slats apart an amount sufficient to fit those distal ends into corresponding ones of the aligned inner and outer recesses in the corner posts.

2. The shelving assembly of claim 1, wherein the recesses comprise open ended slots extending across the entire width of each corner post, the slots having a depth less than the width of the distal end of the slat that fits into the slot during use.

3. The shelving assembly of claim 1, wherein the inner and outer slats have the same rectangular cross-section and the corner posts have a rectangular cross-section, with the aligned inner and outer slots having a rectangular cross-section corresponding to that of the slats but with a slot depth less than the width of the slats.

4. A shelving kit, comprising:
    a plurality of rectangular shelves having opposing ends and sides, each shelf having a pair of adjacent inner and outer slats both of which extend along a different one of the opposing sides of the shelf, each of the pairs of the adjacent inner and outer slats having opposing distal ends each joined by a respective connecting rod limiting movement of each of the pairs of the adjacent inner and outer slats toward each other at the respective connecting rod, the distal ends having a rectangular cross section having a width and height;
    at least first, second, third and fourth corner posts each having opposing inner and outer sides with aligned inner and outer recesses on those inner and outer sides of the corner post, respectively, the recesses located at predetermined distances from a bottom of each corner post where the shelves are to engage the corner posts, each recess sized and shaped to correspond to the distal end of one of the inner and outer slats and to snuggly receive that distal end during use, each of the pairs of adjacent inner and outer slats being sufficiently flexible and close enough together that a user can grab each of the pairs of adjacent inner and outer slats at a location inward of one of the connecting rods and squeeze them toward each other enough to spread the distal ends of the squeezed slats apart an amount sufficient to fit those distal ends into ends of the aligned inner and outer recesses in the corner posts.

5. The shelving kit of claim 4, wherein the recesses comprise open ended slots extending across an entire width of each corner post, the slots having a depth less than the width of the distal end of the slat that fits into the slot during use.

6. The shelving kit of claim 4, wherein each of the pairs of outer and inner slats have the slats spaced apart a distance d and wherein the distal ends of those slats have a height H and wherein the recesses have a height H and extend generally horizontally across the inner side and the outer side at horizontally aligned inner and outer locations where shelves are to attach to the corner posts, and wherein the distance between an inner surface of an aligned inner and outer recess is distance d.

7. The shelving assembly of claim 6, wherein the inner and outer slats have the same rectangular cross-section and the corner posts have a rectangular cross-section, with the aligned recesses having a rectangular cross-section corresponding to that of the slats but with a recess depth less than a width of the slats.

8. A method of fastening horizontal shelves to a plurality of vertical corner posts, comprising:
    providing at least one of the shelves having a pair of adjacent outer and inner slats extending along each opposing side of the at least one shelf, each pair of outer and inner slats spaced apart a distance d and having a height H, each pair of slats having opposing first and second distal ends with the first distal ends connected by a first connecting rod that is perpendicular to the slats, the second distal ends connected by a second connecting rod that is perpendicular to the slats and parallel to the first connecting rod;

providing first, second third and fourth corner posts, each corner post having an inner side and an opposing outer side with a plurality of slots in those sides, the slots having a height H extending generally horizontally across the inner side and the outer side at horizontally aligned inner and outer locations where the shelves are to attach to the corner posts, a distance between an inner surface of aligned ones of the inner and outer slots being a distance d;

placing a first pair of the first distal ends adjacent two aligned ones of the slots on the first corner post;

squeezing the slats associated with the first pair of the first distal ends at a location inward of the first connecting rod to spread the first distal ends of the associated slats apart; and placing each of the distal ends of the associated slats into the two aligned ones of the slots on the first corner post.

9. The method of claim 8, further comprising:

placing a second pair of the first distal ends adjacent two aligned ones of the slots on the second corner post;

squeezing the slats associated with the second pair of the first distal ends at a location inward of the first connecting rod to spread the distal ends of the associated slats apart; and placing each of the distal ends of the associated slats into the two aligned ones of the slots on the second corner post.

10. The method of claim 8, wherein the method is adapted such that if a user has first and second hands, and the squeezing step of claim 8 is performed by the user's first hand while the squeezing steps of claim 9 is performed by the user's second hand.

11. The method of claim 8, wherein the shelves comprise a plurality of equally spaced additional slats and the additional slats are spaced a distance apart adapted for a person to insert fingers between the slats to squeeze them toward each other.

* * * * *